United States Patent Office.

MAX BAZLEN, OF LUDWIGSHAFEN, GERMANY, ASSIGNOR TO THE BADISCHE ANILIN AND SODA FABRIK, OF SAME PLACE.

DOUBLE HYDROSULFITE AND METHOD OF MAKING SAME.

SPECIFICATION forming part of Letters Patent No. 662,338, dated November 20, 1900.

Application filed May 22, 1900. Serial No. 17,545. (No specimens.)

*To all whom it may concern:*

Be it known that I, MAX BAZLEN, doctor of philosophy, a subject of the King of Würtemberg, residing at Ludwigshafen-on-the-Rhine, in the Kingdom of Bavaria and Empire of Germany, have invented new and useful Improvements in Double Hydrosulfite of Zinc and Alkaline-Earth Metals, of which the following is a specification.

My invention relates to the production of certain new solid, stable, and soluble double salts of hydrosulfurous acid containing zinc and a metal of an alkaline earth—namely, barium, strontium, calcium, and magnesium. They may be obtained by double decomposition between a hydrosulfite of one of the above-specified metals and a chlorid of some one other of the above-specified metals, provided, of course, that a zinc salt takes part in the reaction. For instance, zinc hydrosulfite solution may be treated with solid calcium chlorid, or calcium hydrosulfite may be added to zinc-chlorid solution, and the double salt which is formed may be salted out by the addition of common salt. So far as the nature of the resulting product is concerned these processes are the equivalents of one another. These salts have a composition which in the present state of knowledge may be expressed by the formula $ZnM(S_2O_4)_2xH_2O$, (M representing in this formula, as well as hereinafter, a metal of a specified alkaline earth,) and in order that they may be obtained in a pure condition it is advantageous to wash them after filtering with acetone or some other volatile medium easily miscible with water and finally, if desired, with ether. The adhering water is thus quickly removed, which essentially contributes to the stability of the salts.

The following example will serve to illustrate the nature of my invention and how my new product may be obtained: Add thirty (30) parts, by weight, of solid anhydrous calcium chlorid to one hundred (100) parts, by volume, of zinc-hydrosulfite solution, of which five liters will reduce one kilogram of indigo pure, and stir until the calcium chlorid is completely dissolved. Zinc calcium hydrosulfite begins to separate out after standing for some time.

By replacing the calcium chlorid in the above example by twenty (20) parts of anhydrous magnesium chlorid and proceeding as there set forth zinc-magnesium hydrosulfite is obtained.

To rapidly obtain the salts in the dry condition, they may be washed after having collected them on the filter with acetone, ethyl or methyl alcohol, or other volatile medium miscible with water until the adhering moisture is removed, and then the medium employed can be displaced by ether, if desired.

My new double hydrosulfites are white crystalline bodies, soluble in water, and when dry are stable for months in the presence of air. They have a chemical composition corresponding to the formula $ZnM(S_2O_4)_2xH_2O$, where M represents a metal of a specified alkaline earth. They do not burn when heated, but give off sulfurous acid. They decolorize indigo sulfonic-acid solution. They give a precipitate with caustic-soda solution which is not entirely dissolved by excess of caustic soda.

The specific double salt which I wish to claim possesses all the above-mentioned generic properties and has the chemical composition represented by the formula $ZnCa(S_2O_4)_2 + xH_2O$.

Now what I claim is—

1. The process for the production of a double hydrosulfite of zinc and a metal of the alkaline earths, which consists in treating zinc hydrosulfite with a salt of a metal of the alkaline earths, washing the separated product with a volatile medium and drying, substantially as hereinbefore described.

2. The process for the production of a double hydrosulfite of zinc and a metal of the alkaline earths, which consists in treating zinc hydrosulfite with a salt of a metal of the alkaline earths, substantially as hereinbefore described.

3. As a new product the double hydrosulfite of zinc and a specified metal of the alkaline earths which has a chemical composition corresponding to the formula: $ZnM(S_2O_4)_2xH_2O$ and is stable for months in the presence of air, which gives off sulfurous acid when heated without burning, and gives with a solution of caustic soda a precipitate which is only partially soluble in excess of caustic soda.

4. As a new product the double hydrosulfite of zinc and calcium which has a chemical composition corresponding to the formula: $ZnCa(S_2O_4)_2 + xH_2O$, and is stable for months in the presence of air, which gives off sulfurous acid when heated without burning, and gives with caustic-soda solution a precipitate which is only partially soluble in excess of caustic-soda solution.

In testimony whereof I have hereunto set my hand in the presence of two subscribing witnesses.

MAX BAZLEN.

Witnesses:
  J. L. HEINKE,
  PERCY J. JONES.